US012680469B2

(12) United States Patent
Senoo et al.

(10) Patent No.: US 12,680,469 B2
(45) Date of Patent: Jul. 14, 2026

(54) METHOD FOR ESTIMATING EROSION OF STEAM TURBINE ROTOR BLADE USING CONCENTRATION OF SUBSTANCE IN FEED WATER

(71) Applicant: MITSUBISHI HEAVY INDUSTRIES, LTD., Tokyo (JP)

(72) Inventors: Shigeki Senoo, Tokyo (JP); Soichiro Tabata, Tokyo (JP); Tetsuya Sawatsubashi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 304 days.

(21) Appl. No.: 18/564,892

(22) PCT Filed: Mar. 30, 2022

(86) PCT No.: PCT/JP2022/016218
§ 371 (c)(1),
(2) Date: Nov. 28, 2023

(87) PCT Pub. No.: WO2023/276387
PCT Pub. Date: Jan. 5, 2023

(65) Prior Publication Data
US 2024/0287914 A1 Aug. 29, 2024

(30) Foreign Application Priority Data
Jun. 30, 2021 (JP) ................................ 2021-109140

(51) Int. Cl.
*F01D 21/00* (2006.01)
*F01D 5/28* (2006.01)
*F01K 13/00* (2006.01)

(52) U.S. Cl.
CPC ........... *F01D 21/003* (2013.01); *F01D 5/282* (2013.01); *F01K 13/003* (2013.01);
(Continued)

(58) Field of Classification Search
CPC .................................... F01D 5/14; F01D 5/28
(Continued)

(56) References Cited

U.S. PATENT DOCUMENTS

2001/0034582 A1 10/2001 Umezawa et al.
2012/0285226 A1 11/2012 Laurer et al.
(Continued)

FOREIGN PATENT DOCUMENTS

JP 57-131034 8/1982
JP 60-145401 7/1985
(Continued)

OTHER PUBLICATIONS

International Search Report issued Jun. 21, 2022 in corresponding International Application No. PCT/JP2022/016218, with English translation.
(Continued)

*Primary Examiner* — Eric S. McCall
(74) *Attorney, Agent, or Firm* — Wenderoth, Lind & Ponack, L.L.P.

(57) ABSTRACT

An erosion estimation method is for estimating a degree of progress of erosion of a last-stage rotor blade of a steam turbine. The erosion estimation method includes: sampling supplied water containing a substance to be detected, which is included in a material constituting the last-stage rotor blade, from a water supply line that is connected to the steam turbine; measuring a concentration of the substance; and estimating the degree of progress of the erosion of the last-stage rotor blade based on the concentration of the substance.

6 Claims, 5 Drawing Sheets

(52) U.S. Cl.
CPC ...... *F05D 2220/31* (2013.01); *F05D 2220/72* (2013.01); *F05D 2260/80* (2013.01)

(58) Field of Classification Search
USPC ........................................................ 73/112.01
See application file for complete search history.

(56) References Cited

U.S. PATENT DOCUMENTS

| | | | | |
|---|---|---|---|---|
| 2013/0089463 | A1* | 4/2013 | Hefner | G01N 17/043 422/53 |
| 2013/0101425 | A1 | 4/2013 | Arai et al. | |
| 2017/0016334 | A1* | 1/2017 | Okuda | B23K 26/147 |
| 2019/0301308 | A1 | 10/2019 | Sekine et al. | |
| 2024/0318555 | A1* | 9/2024 | Kawai | F01D 5/005 |

FOREIGN PATENT DOCUMENTS

| | | |
|---|---|---|
| JP | 8-178172 | 7/1996 |
| JP | 2001-65303 | 3/2001 |
| JP | 2001-263006 | 9/2001 |
| JP | 2009-162143 | 7/2009 |
| JP | 2015-140762 | 8/2015 |
| JP | 2019-178824 | 10/2019 |

OTHER PUBLICATIONS

Written Opinion of the International Searching Authority issued Jun. 21, 2022 in corresponding International Application No. PCT/JP2022/016218, with English translation.

B. S. Dorogov, Erosion of Blades in Steam Turbines, available at https://apps.dtic.mil/sti/tr/pdf/AD0663342.pdf, Jan. 10, 1968.

* cited by examiner

METHOD FOR ESTIMATING EROSION OF STEAM TURBINE ROTOR BLADE USING CONCENTRATION OF SUBSTANCE IN FEED WATER

CROSS-REFERENCE TO RELATED APPLICATION

This application claims priority to Japanese Patent Application No. 2021-109140 filed on Jun. 30, 2021, the contents of which are incorporated herein by reference.

TECHNICAL FIELD

The present disclosure relates to an erosion estimation method.

BACKGROUND ART

In a steam turbine, water droplets condensed on a surface of a stator vane are scattered on a steam flow and collide with a surface of a rotor blade on a downstream side, which may cause erosion. In particular, it is known that erosion is likely to occur in a final stage rotor blade. When this erosion progresses, the strength of a blade is likely to be affected by the progress of the erosion.

In the related art, a method has been adopted in which a turbine casing is opened to expose blades and the degree of progress of erosion is evaluated by being actually measured at the time of a periodic inspection of a steam turbine. However, since it takes a lot of time and cost to open the turbine casing, there has been a demand to reduce the frequency of opening the turbine casing in recent years.

Meanwhile, as disclosed in Japanese Unexamined Patent Application Publication No. 2019-178824, in the related art, a method has also been proposed in which the quality of feed water is inspected in order to detect erosion of each part of a steam turbine system.

CITATION LIST

Patent Literature

[PTL 1] Japanese Unexamined Patent Application Publication No. 2019-178824

SUMMARY OF INVENTION

Technical Problem

However, a method for estimating the degree of progress of erosion from the quality of feed water has not been established.

The present disclosure has been made to solve the above problems, and an object of the present disclosure is to provide an erosion estimation method that can easily estimate the degree of progress of erosion at low cost.

Solution to Problem

In order to achieve the object, according to the present disclosure, there is provided an erosion estimation method for estimating a degree of progress of erosion of a final stage rotor blade of a steam turbine. The erosion estimation method includes: a step of sampling feed water including a substance to be detected that is included in a material forming the final stage rotor blade from a water supply line connected to the steam turbine; a step of measuring a concentration of the substance to be detected in the sampled feed water; and a step of estimating the degree of progress of the erosion on the basis of the concentration.

Advantageous Effects of Invention

According to the present disclosure, it is possible to provide an erosion estimation method that can easily estimate the degree of progress of erosion at low cost.

DESCRIPTION OF EMBODIMENTS

Hereinafter, a steam turbine system 100, a final stage rotor blade 90, and an erosion estimation method according to an embodiment of the present disclosure will be described with reference to FIGS. 1 to 4.

(Configuration of Steam Turbine System)

Figure 1:
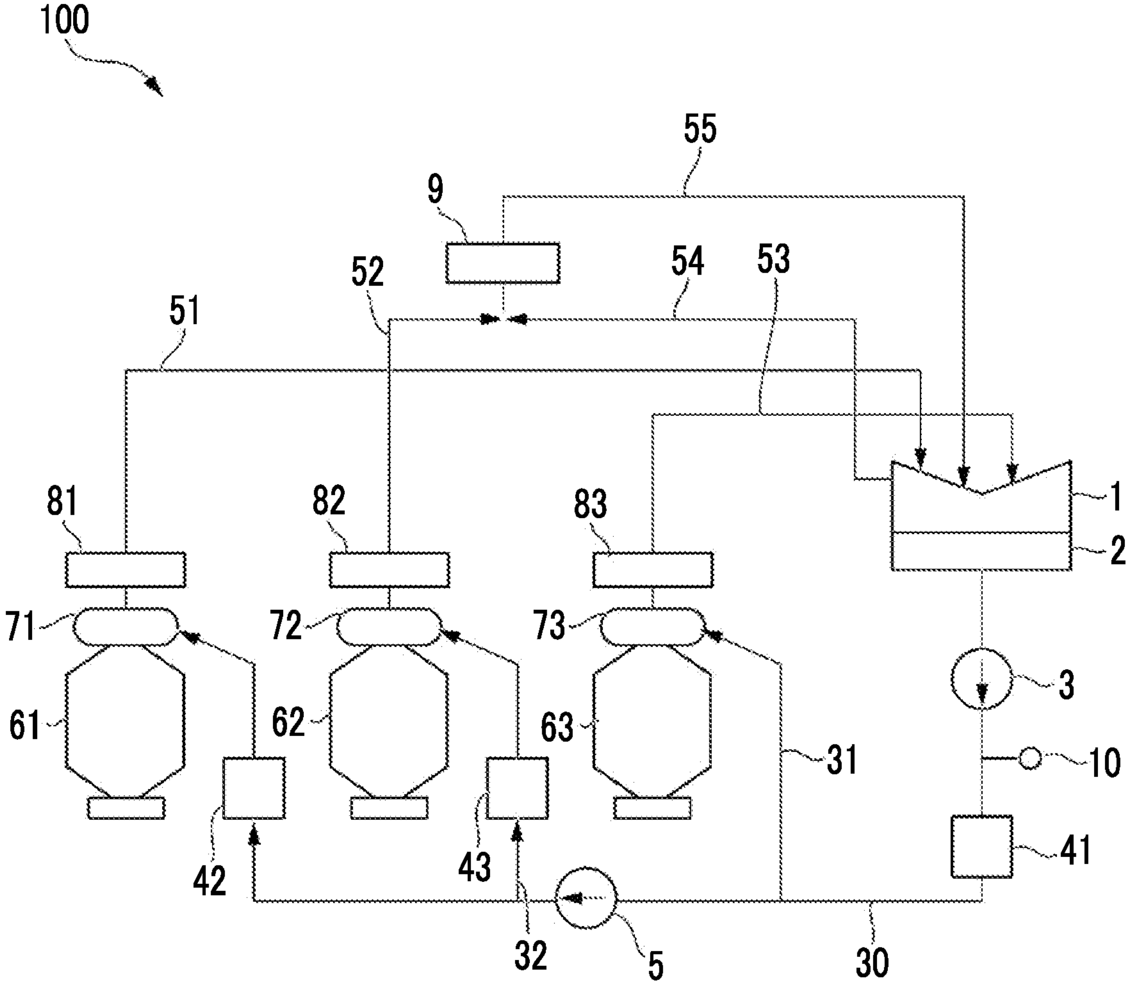
FIG. 1 is a system diagram showing a configuration of a steam turbine system according to an embodiment of the present disclosure.

As shown in FIG. 1, the steam turbine system 100 includes a steam turbine 1, a condenser 2, a condensate pump 3, a low-pressure economizer 41, a medium-pressure economizer 43, a high-pressure economizer 42, a water supply pump 5, a high-pressure evaporator 61, a medium-pressure evaporator 62, a low-pressure evaporator 63, a high-pressure drum 71, a medium-pressure drum 72, a low-pressure drum superheater 81, a medium-pressure superheater 82, a low-pressure superheater 83, a reheater 9, a sampling line 10, a water supply line 30, a high-pressure steam line 51, a medium-pressure steam line 52, a low-pressure steam line 53, an air bleeding line 54, and a reheat steam line 55.

(Configuration of Steam Turbine)

Figure 2:
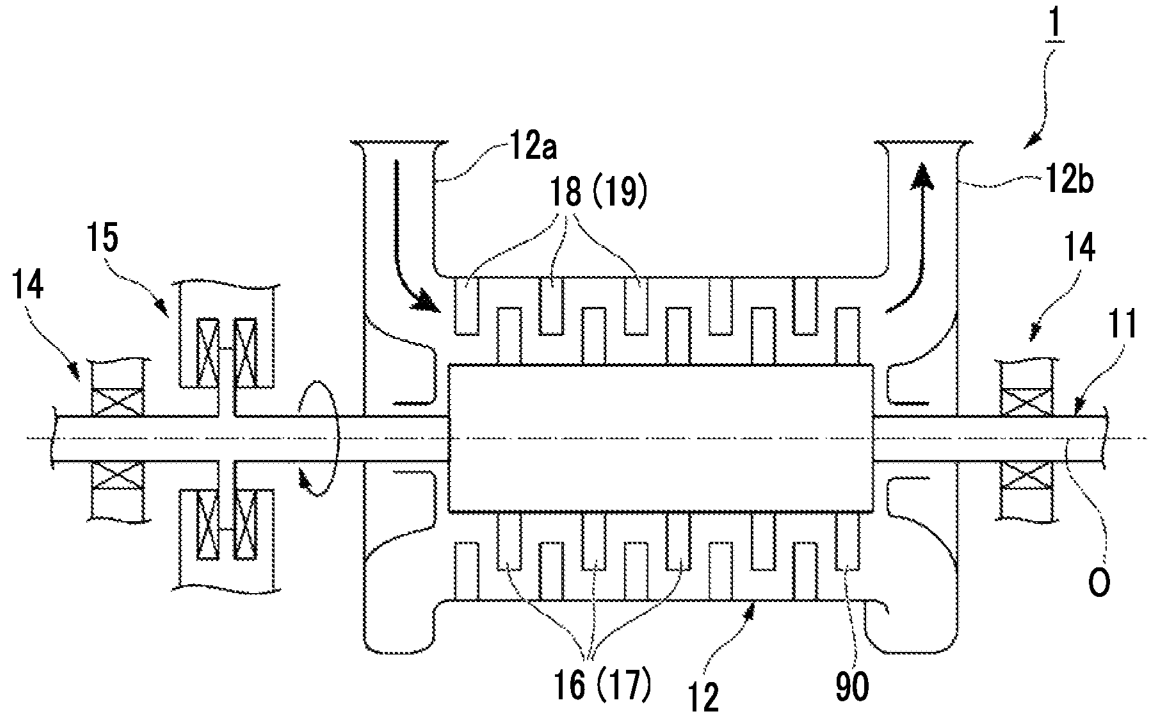
FIG. 2 is a schematic view showing a configuration of a steam turbine according to the embodiment of the present disclosure.

As shown in FIG. 2, the steam turbine 1 includes a rotary shaft 11, a casing 12, a rotor blade row 16, and a stator vane row 18. The rotary shaft 11 extends along an axis O and is rotatable about the axis O. A pair of journal bearings 14 and one thrust bearing 15 are provided at a shaft end of the rotary shaft 11. The journal bearings 14 support a load on the rotary shaft 11 in a radial direction. The thrust bearing 15 supports a load on the rotary shaft 11 in a direction of the axis O.

A plurality of rotor blade rows 16 that are arranged at intervals in the direction of the axis O are provided on an outer peripheral surface of the rotary shaft 11. Each of the rotor blade rows 16 has a plurality of rotor blades 17 that are arranged at intervals in a circumferential direction with respect to the axis O. The rotor blade 17 included in a rotor blade row 16 that is located closest to one side in the direction of the axis O among the plurality of rotor blade rows 16 is referred to as the final stage rotor blade 90.

The casing 12 covers the rotary shaft 11 and the rotor blade rows 16 from an outer peripheral side. The casing 12 has a tubular shape having the axis O as a center. A steam supply port 12*a* for guiding steam from the outside is formed on the other side of the casing 12 in the direction of the axis O. A steam discharge port 12*b* for guiding steam to the outside is formed on one side of the casing 12 in the direction of the axis O. A steam flow path is provided between the steam supply port 12*a* and the steam discharge port 12*b*. In the following description, a side on which the steam supply port 12*a* is located as viewed from the steam discharge port 12*b* is referred to as an upstream side, and a side opposite to the upstream side is referred to as a downstream side.

A plurality of stator vane rows 18 that are arranged at intervals in the direction of the axis O are provided on an inner peripheral surface of the casing 12. Each of the stator vane rows 18 has a plurality of stator vanes 19 that are arranged at intervals in the circumferential direction with respect to the axis O. In addition, the stator vane rows 18 and the rotor blade rows 16 are alternately arranged in the direction of the axis O. That is, one rotor blade row 16 is disposed on the downstream side of one stator vane row 18.

(Configuration of Final Stage Rotor Blade)

Figure 3:
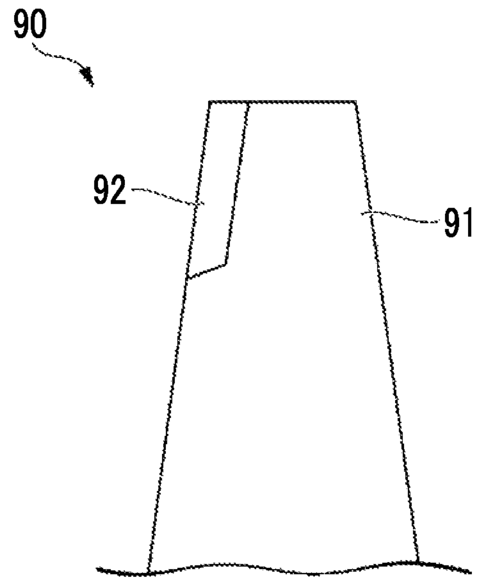
FIG. 3 is a schematic view showing a configuration of a final stage rotor blade row according to the embodiment of the present disclosure.

As shown in FIG. 3, the final stage rotor blade 90 includes a blade main body 91 and an erosion shield 92. The blade main body 91 extends outward in the radial direction from the outer peripheral surface of the rotary shaft 11. As viewed from the radial direction, a cross-sectional shape of the blade main body 91 is a blade shape having a leading edge on the upstream side. The erosion shield 92 is provided in a leading edge portion which is a tip portion (that is, a portion including an outer end portion in the radial direction) of the blade main body 91. The erosion shield 92 is provided to prevent the occurrence of erosion on a surface of the final stage rotor blade 90 caused by droplets scattered from the stator vane row 18 on the upstream side. The erosion shield 92 is integrally made of Stellite. Stellite is a metallic material including a cobalt element as a main component. In this embodiment, the cobalt element included in Stellite is referred to as a substance to be detected, which will be described in detail below.

(Other Components of Steam Turbine System)

As shown in FIG. 1, the water supply line 30 is connected to the downstream side (that is, the steam discharge port 12*b*) of the steam turbine 1. The condenser 2, the condensate pump 3, the sampling line 10, the low-pressure economizer 41, and the water supply pump 5 are provided on the water supply line 30 in this order from the side of the steam turbine 1.

The condenser 2 is a device for cooling low-pressure steam discharged from the steam turbine 1 and converting the low-pressure steam back to liquid water. The condensate pump 3 pumps the liquid water toward the downstream side on the water supply line. The sampling line 10 is a pipe for drawing a part of feed water that flows in the water supply line 30 to the outside. The low-pressure economizer 41 is provided to preheat the feed water. The water supply pump 5 further pumps the feed water in the water supply line 30.

A downstream-side end portion of the water supply line 30 is connected to the high-pressure economizer 42. A first branch line 31 is connected between the low-pressure economizer 41 and the water supply pump 5 in the water supply line 30. A downstream-side end portion of the first branch line 31 is connected to the low-pressure evaporator 63 which will be described below. Further, a second branch line 32 is connected to the downstream side of the water supply pump 5 in the water supply line 30. A downstream-side end portion of the second branch line 32 is connected to the medium-pressure economizer 43.

Similarly to the low-pressure economizer 41, the medium-pressure economizer 43 and the high-pressure economizer 42 are devices for preheating the feed water. The feed water preheated by the low-pressure economizer 41 is sent to the low-pressure evaporator 63. The low-pressure evaporator 63 further heats the feed water to generate low-pressure steam. The feed water preheated by the medium-pressure economizer 43 is sent to the medium-pressure evaporator 62. The medium-pressure evaporator 62 further heats the feed water to generate medium-pressure steam. Similarly, the feed water preheated by the high-pressure economizer 42 is sent to the high-pressure evaporator 61. The high-pressure evaporator 61 further heats the feed water to generate high-pressure steam.

The high-pressure drum 71 is provided to separate the high-pressure steam generated by the high-pressure evaporator 61 into gas and liquid. A gas-phase component of the separated gas and liquid is sent to the high-pressure superheater 81 through the high-pressure steam line 51. The high-pressure superheater 81 superheats the high-pressure steam to generate high-pressure superheated steam. The high-pressure superheated steam is sent to the steam turbine 1 through the high-pressure steam line 51.

The medium-pressure drum 72 is provided to separate the medium-pressure steam generated by the medium-pressure evaporator 62 into gas and liquid. A gas-phase component of the separated gas and liquid is sent to the medium-pressure superheater 82 through the medium-pressure steam line 52. The medium-pressure superheater 82 superheats the medium-pressure steam to generate medium-pressure superheated steam. The medium-pressure superheated steam is sent to the reheater 9 through the medium-pressure steam line 52. The reheater 9 further heats the medium-pressure superheated steam. The superheated steam heated by the reheater 9 is sent to the steam turbine 1 through the reheat steam line 55. Further, a part of the steam extracted from the steam turbine 1 flows into the reheater 9 through the air bleeding line 54. The extracted steam is also heated by the reheater 9 and then is supplied to the steam turbine 1 through the reheat steam line 55.

The low-pressure drum 73 is provided to separate the low-pressure steam generated by the low-pressure evaporator 63 into gas and liquid. A gas-phase component of the separated gas and liquid is sent to the low-pressure superheater 83 through the low-pressure steam line 53. The low-pressure superheater 83 superheats the low-pressure steam to generate low-pressure superheated steam. The low-pressure superheated steam is sent to the steam turbine 1 through the low-pressure steam line 53.

(Erosion Estimation Method)

Next, the erosion estimation method according to this embodiment will be described. Here, in a case in which the steam turbine 1 is operated, the temperature of the steam is higher toward the upstream side of the steam flow path, and the temperature of the steam is lower toward the downstream side. Therefore, in a downstream-side region, steam is likely to be condensed, and water droplets (liquid droplets) are likely to be generated. The water droplets may further flow to the downstream side on a steam flow and collide with the rotating rotor blade row 16. Then, the surface of the rotor blade row 16 is eroded by the energy of the collision (erosion occurs). In particular, it is known that erosion is likely to occur in the final stage rotor blade 90. When this erosion progresses, the strength of a blade is likely to be affected by the progress of the erosion. Therefore, in this embodiment, the degree of progress of the erosion is estimated by the following method.

Figure 4:
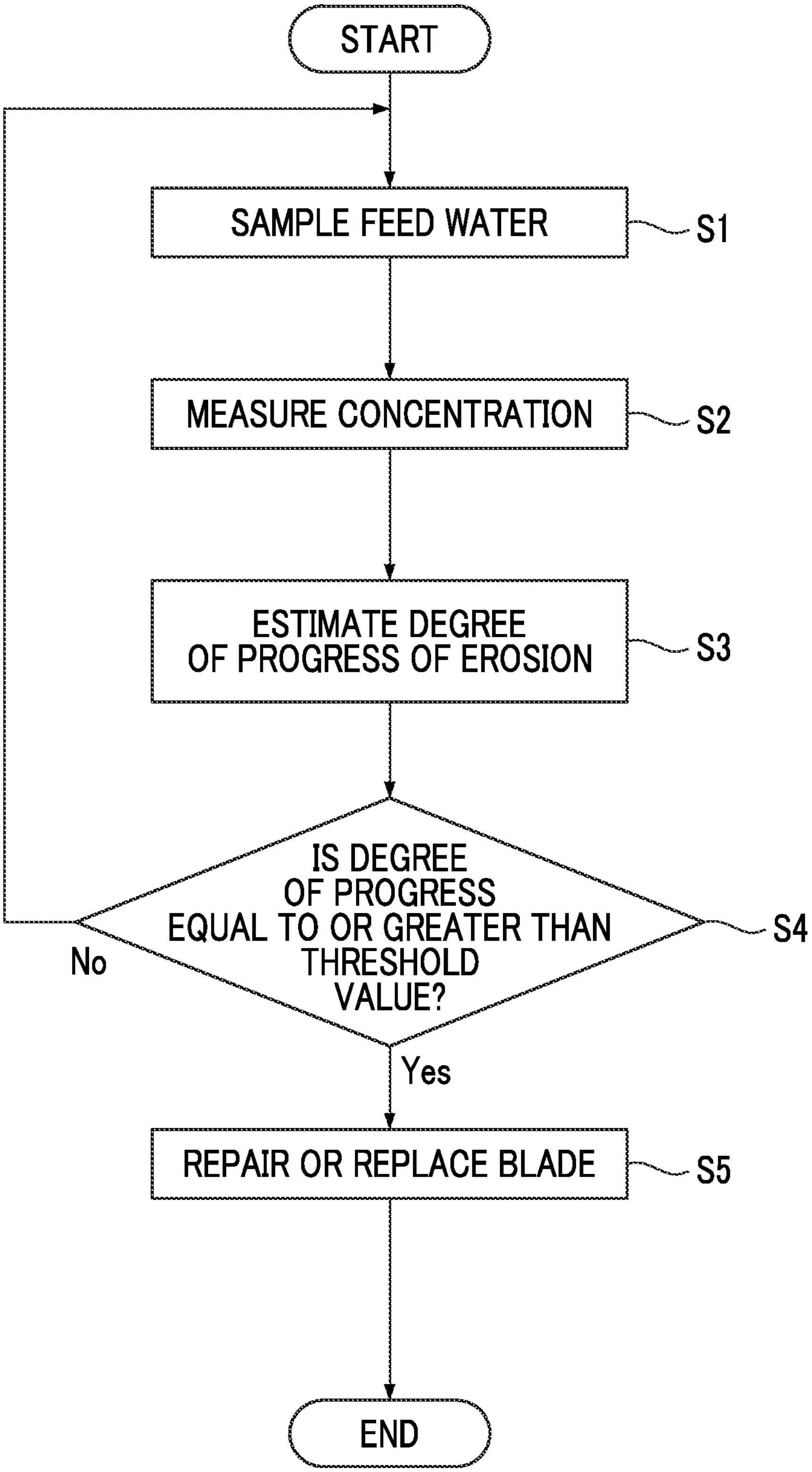
FIG. 4 is a flowchart showing steps of an erosion estimation method according to the embodiment of the present disclosure.

As shown in FIG. 4, the erosion estimation method according to this embodiment includes Step S1 of sampling feed water, Step S2 of measuring the concentration of the substance to be detected in the feed water, Step S3 of estimating the degree of progress of erosion from the concentration, Step S4 of determining whether the degree of progress is equal to or greater than a predetermined threshold value, and Step S5 of repairing or replacing the final stage rotor blade 90 in a case in which it is determined that the degree of progress is equal to or greater than the threshold value.

In Step S1, a part of the feed water is sampled through the sampling line 10. In the process of the progress of the erosion, a part of the erosion shield 92 is eroded, and a component of the part is included in the feed water. Therefore, in this embodiment, the cobalt element that is included in Stellite forming the erosion shield 92 is used as the substance to be detected. In Step S2, the concentration of the cobalt element included in the sampled feed water is measured. A plasma mass spectrometer is preferably used to measure the concentration.

Figure 5:
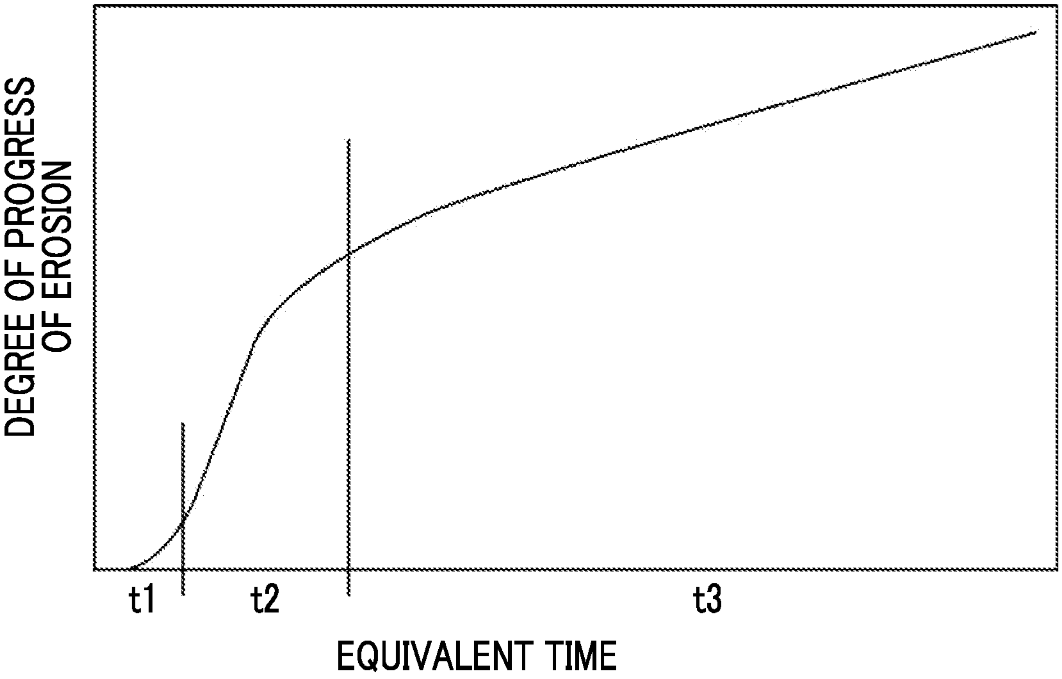
FIG. 5 is a graph showing an example of a degree of progress of erosion in the final stage rotor blade.

In the subsequent Step S3, the degree of progress of the erosion is estimated on the basis of the concentration of the cobalt element measured in Step S2. Here, it is known that erosion follows a time change shown in a graph of FIG. 5. In the graph shown in FIG. 5, a horizontal axis is not the real time, but is an equivalent time represented by a function having the humidity of steam, the output of the steam turbine, and a steam flow rate as variables. A vertical axis in the graph indicates the degree of progress of the erosion. As represented by a curve in FIG. 5, erosion hardly occurs or is very slight until a certain period (initial time t1) elapses from the start of an operation. On the other hand, in a period (transition period t2) after the lapse of the initial time t1, the erosion rapidly progresses. After that, in a stable period t3, the slope of the degree of progress of the erosion is gentle, and the degree of progress has a roughly constant value. In Step S3, collation with the graph shown in FIG. 5 is performed on the basis of the amount of change in the cobalt element over time to estimate the degree of progress of the erosion. That is, it is estimated to which time the current degree of progress of the erosion corresponds in the graph shown in FIG. 5 from the amount of change in the cobalt element over time.

In Step S4, it is determined whether or not the degree of progress of the erosion is equal to or greater than a threshold value. In a case in which it is determined that the degree of progress is equal to or greater than the threshold value (Step S4: Yes), the final stage rotor blade 90 is replaced or repaired in the subsequent Step S5. In a case in which it is determined that the degree of progress is less than the threshold value (Step S4: No), Steps S1 to S4 are repeatedly performed. In this way, all of the steps of the erosion estimation method according to this embodiment are completed.

(Operation and Effect)

As described above, according to the above method, simply by measuring the concentration of the substance to be detected in the feed water, it is possible to estimate the degree of progress of the erosion of the final stage rotor blade 90 without opening the casing 12 of the steam turbine 1. In particular, in inspection work involving the opening of the casing 12, in addition to the cost of the work, a large cost is incurred for the user because it is not possible to operate the steam turbine during an inspection period. The adoption of the above method makes it possible to reduce the frequency of the opening and to reduce costs due to maintenance and lost operation opportunities.

In addition, according to the above method, the erosion shield 92 in which erosion is most likely to be concentrated includes the substance to be detected which is not used in other parts of the steam turbine. Therefore, it is possible to estimate the degree of progress of the erosion with high accuracy on the basis of the concentration of the substance to be detected.

Furthermore, according to the above method, the cobalt element is used as the substance to be detected. Since the cobalt element is not used in other parts and exhibits properties similar to those of iron (Fe), the existing monitoring facility provided for the purpose of detecting iron content can be easily used to estimate erosion. In other words, in many steam turbine systems 100, a facility similar to the sampling line 10 has already been provided. Therefore, it is possible to sample the feed water using the facility.

In addition, according to the above method, the degree of progress of the erosion can be estimated by sampling relatively low-temperature feed water flowing between the condensate pump 3 and the economizer (low-pressure economizer 41). Therefore, for example, since an operator does not need to be exposed to high-temperature steam or feed water, it is possible to reduce the burden on the operator.

Other Embodiments

The embodiment of the present disclosure has been described in detail above with reference to the drawings. However, the specific configuration is not limited to the embodiment and includes design changes or the like without departing from the gist of the present disclosure.

For example, in the above-described embodiment, an example has been described in which the cobalt element included in Stellite forming the erosion shield is used as the substance to be detected. However, it is also possible to embed the substance to be detected in the blade main body 91 while changing the degree of penetration. According to this configuration, the substance to be detected is embedded in the blade main body 91. Therefore, even when erosion progresses in any part of the blade main body 91, it is possible to detect the progress of the erosion with high accuracy.

Further, instead of the cobalt element, a radioactive element impregnated in the final stage rotor blade 90 in advance can also be used as the substance to be detected.

According to the above-described configuration, the radioactive element is used as the substance to be detected. The radioactive element is not used in other parts of the steam turbine. Therefore, the use of the radioactive element as the substance to be detected makes it possible to clearly estimate the degree of progress of the erosion with high accuracy.

Figure 6:
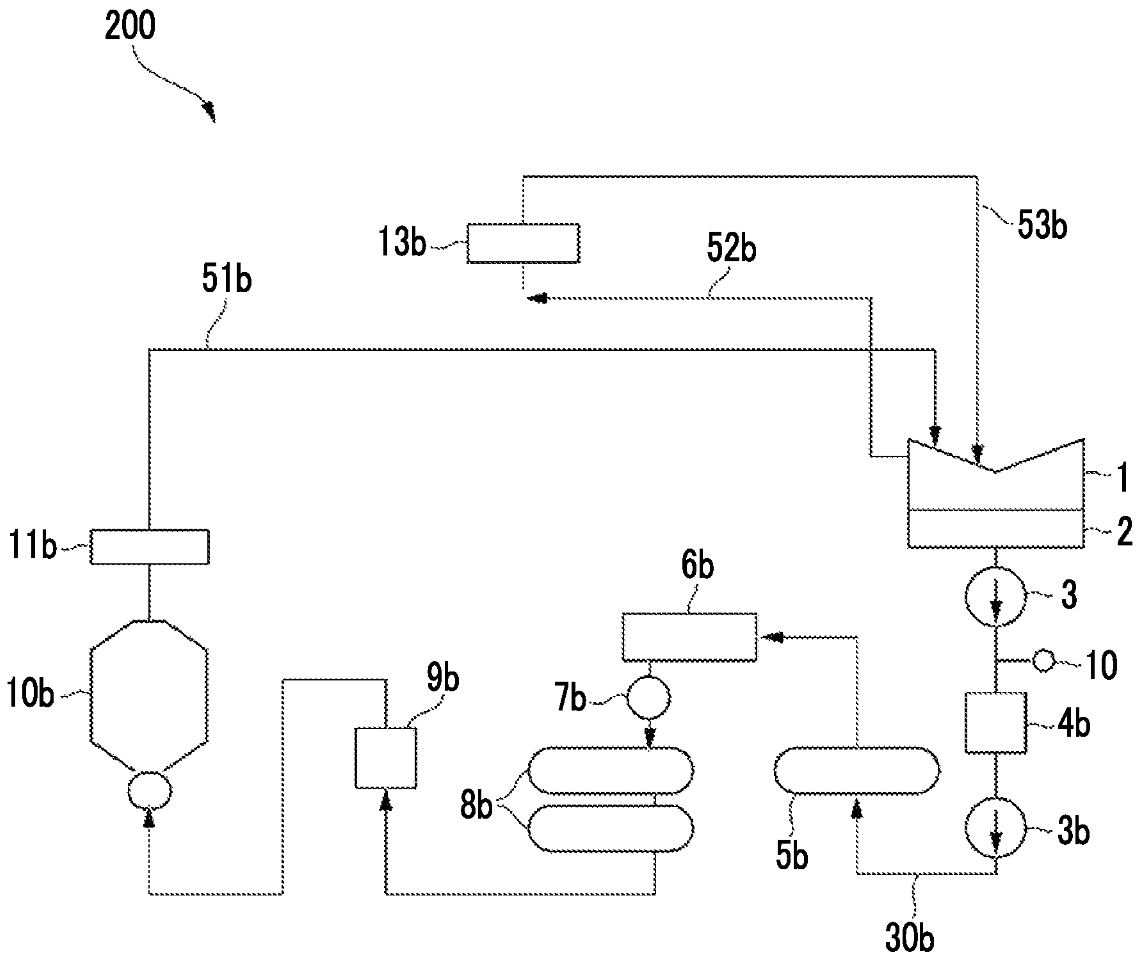
FIG. 6 is a system diagram showing a modification example of the steam turbine system according to the embodiment of the present disclosure.

In addition, in the above-described embodiment, an example has been described in which the erosion estimation method is applied to the steam turbine 1 in the steam turbine system 100. However, it is also possible to apply the erosion estimation method to a thermal power generation system 200 shown in FIG. 6.

In the thermal power generation system 200, the condenser 2, the condensate pump 3, the sampling line 10, a desalination apparatus **4*b*, a condensate booster pump 3*b*, a plurality of low-pressure heaters 5b, a deaerator 6b, a water supply pump 7b, a plurality of high-pressure heaters 8b, an economizer 9b, a furnace 10b, and a superheater 11b are provided on a water supply line 30b in order from the steam turbine 1 to the downstream side. Superheated steam generated by the superheater 11b is sent to the steam turbine 1 through a high-pressure steam line 51b. Further, a part of the steam in the steam turbine 1 is sent to a reheater 13b through an air bleeding line 52b. The steam heated by the reheater 13b is sent to the steam turbine 1 through a reheat steam line 53**b.

Among these elements, the sampling line 10 may be provided at any place within a section from the condenser 2 to the low-pressure heater 5b in the water supply line 30b.

<Supplementary Notes>

For example, an erosion estimation method according to each embodiment is understood as follows.

(1) According to a first aspect, there is provided an erosion estimation method for estimating a degree of progress of erosion of the final stage rotor blade 90 of the steam turbine 1. The erosion estimation method includes: Step S1 of sampling feed water including a substance to be detected that is included in a material forming the final stage rotor blade 90 from the water supply line 30 or 30b connected to the steam turbine 1; Step S2 of measuring a concentration of the substance to be detected in the sampled feed water; and Step S3 of estimating the degree of progress of the erosion on the basis of the concentration.

According to the above method, simply by measuring the concentration of the substance to be detected in the feed water, it is possible to estimate the degree of progress of the erosion of the final stage rotor blade 90 without opening the casing 12 of the steam turbine 1.

(2) According to a second aspect, in the erosion estimation method, the final stage rotor blade 90 may include the blade main body 91 and the erosion shield 92 that is provided on the leading edge side of the tip portion of the blade main body 91 and that is made of a material including the substance to be detected.

According to the above method, the substance to be detected is included in the erosion shield 92 in which erosion is most likely to be concentrated. Therefore, it is possible to detect the degree of progress of the erosion with higher accuracy.

(3) According to a third aspect, in the erosion estimation method, the final stage rotor blade 90 may include the blade main body 91 and the substance to be detected that is embedded in the blade main body 91.

According to the above method, the substance to be detected is embedded in the blade main body 91. Therefore, even when erosion progresses in any part of the blade main body 91, it is possible to detect the progress of the erosion with high accuracy.

(4) According to a fourth aspect, in the erosion estimation method, the substance to be detected may be a cobalt element.

According to the above method, the cobalt element is used as the substance to be detected. Since the cobalt element exhibits properties similar to those of iron (Fe), the existing monitoring facility that is provided for the purpose of detecting iron content can be easily used to estimate erosion.

(5) According to a fifth aspect, in the erosion estimation method, the substance to be detected may be a radioactive element impregnated in the final stage rotor blade 90 in advance.

According to the above method, the radioactive element is used as the substance to be detected. The radioactive element is not used in other parts of the steam turbine 1. Therefore, the use of the radioactive element as the substance to be detected makes it possible to clearly estimate the degree of progress of the erosion with high accuracy.

(6) According to a sixth aspect, in the erosion estimation method, in the steam turbine system 100 including the condenser 2 that cools steam discharged from the steam turbine 1 and that converts the steam back to water, the condensate pump 3 that is provided on the downstream side of the condenser 2, an economizer (low-pressure economizer 41) that is provided on the downstream side of the condensate pump 3 and that preheats the water, an evaporator (the high-pressure evaporator 61, the medium-pressure evaporator 62, and the low-pressure evaporator 63) that heats the water preheated by the economizer to generate steam, and a superheater (the high-pressure superheater 81, the medium-pressure superheater 82, and the low-pressure superheater 83) that superheats the steam generated by the evaporator, in Step S1 of sampling the feed water, the feed water may be sampled between the condensate pump 3 and the economizer.

According to the above method, relatively low-temperature feed water that flows between the condensate pump 3 and the low-pressure economizer 41 can be sampled to estimate the degree of progress of the erosion. Therefore, for example, it is not necessary to come into contact with high-temperature steam or feed water, which makes it possible to reduce the burden on the operator.

INDUSTRIAL APPLICABILITY

According to the present disclosure, it is possible to provide an erosion estimation method that can easily estimate the degree of progress of erosion at low cost.

REFERENCE SIGNS LIST

100: Steam turbine system
1: Steam turbine
2: Condenser
3: Condensate pump
3b: Condensate booster pump
4b: Desalination apparatus
5: Water supply pump
5b: Low-pressure heater
6b: Deaerator
7b: Water supply pump
8b: High-pressure heater
9: Reheater
9b: Economizer
10b: Furnace
10: Sampling line
11: Rotary shaft
11b: Superheater
12: Casing
12a: Steam supply port
12b: Steam discharge port
13b: Reheater
14: Journal bearing
15: Thrust bearing
16: Rotor blade row
17: Rotor blade
18: Stator vane row
19: Stator vane
30, 30b: Water supply line
31: First branch line
32: Second branch line

41: Low-pressure economizer
42: High-pressure economizer
43: Medium-pressure economizer
51, 51*b*: High-pressure steam line
52: Medium-pressure steam line
53: Low-pressure steam line
54, 52*b*: Air bleeding line
55, 53*b*: Reheat steam line
61: High-pressure evaporator
62: Medium-pressure evaporator
63: Low-pressure evaporator
71: High-pressure drum
72: Medium-pressure drum
73: Low-pressure drum
81: High-pressure superheater
82: Medium-pressure superheater
83: Low-pressure superheater
90: Final stage rotor blade
91: Blade main body
92: Erosion shield
200: Thermal power generation system
O: Axis

The invention claimed is:

1. An erosion estimation method for estimating a degree of progress of erosion of a final stage rotor blade of a steam turbine, the erosion estimation method comprising:

sampling feed water including a substance to be detected that is included in a material forming the final stage rotor blade from a water supply line connected to the steam turbine;

measuring a concentration of the substance to be detected in the feed water that has been sampled; and estimating the degree of progress of the erosion based on the concentration of the substance to be detected, wherein, in the estimating of the degree of progress of the erosion, it is estimated to which time an initial time or a transition period in which the erosion rapidly progresses relative to the initial time after a lapse of the initial time or a stable period in which a slope of the degree of progress of the erosion is gentle relative to the transition period after a lapse of the transition period the degree of progress of the erosion corresponds from an amount of change in the substance to be detected over time.

2. The erosion estimation method according to claim 1, wherein the final stage rotor blade includes a blade main body and an erosion shield that is on a leading edge side of a tip portion of the blade main body and made of a material including the substance to be detected.

3. The erosion estimation method according to claim 1, wherein the final stage rotor blade includes a blade main body and the substance to be detected that is embedded in the blade main body.

4. The erosion estimation method according to claim 1, wherein the substance to be detected is a cobalt element.

5. The erosion estimation method according to claim 1, wherein the substance to be detected is a radioactive element that has been impregnated into the final stage rotor blade in advance.

6. The erosion estimation method according to claim 1, wherein, in a steam turbine system including a condenser that cools steam discharged from the steam turbine and converts the steam back to water, a condensate pump that is on a downstream side of the condenser, an economizer that is on a downstream side of the condensate pump and preheats the water, an evaporator that heats the water preheated by the economizer to generate steam, and a superheater that superheats the steam generated by the evaporator, in the sampling of the feed water, the feed water is sampled between the condensate pump and the economizer.

* * * * *